US009588535B2

(12) United States Patent
Solodovnik et al.

(10) Patent No.: US 9,588,535 B2
(45) Date of Patent: Mar. 7, 2017

(54) RESETTING A MOTOR CONTROLLER FOR POWER SYSTEM PROTECTION

(71) Applicant: The Boeing Company, Chicago, IL (US)

(72) Inventors: Eugene V. Solodovnik, Lake Stevens, WA (US); Jeffrey J. White, Shoreline, WA (US)

(73) Assignee: THE BOEING COMPANY, Chicago, IL (US)

( * ) Notice: Subject to any disclaimer, the term of this patent is extended or adjusted under 35 U.S.C. 154(b) by 264 days.

(21) Appl. No.: 14/311,874

(22) Filed: Jun. 23, 2014

(65) Prior Publication Data

US 2014/0303800 A1 Oct. 9, 2014

Related U.S. Application Data

(62) Division of application No. 13/315,555, filed on Dec. 9, 2011, now Pat. No. 8,760,094.

(51) Int. Cl.
*H02H 7/08* (2006.01)
*G05F 1/66* (2006.01)
(Continued)

(52) U.S. Cl.
CPC ............... *G05F 1/66* (2013.01); *B60R 16/03* (2013.01); *H02H 7/125* (2013.01); *H02P 1/021* (2013.01)

(58) Field of Classification Search
USPC ........ 318/400.21, 400.22, 782; 702/58, 185; 361/23, 42, 94, 534
See application file for complete search history.

(56) References Cited

U.S. PATENT DOCUMENTS 4,617,501 A 10/1986 Smith
4,734,634 A * 3/1988 Kito .................... H02P 29/025
139/1 E
(Continued)

FOREIGN PATENT DOCUMENTS

EP 1921741 5/2008
EP 2254134 11/2010

OTHER PUBLICATIONS

Solodovnik, "Power System Protecction", U.S. Appl. No. 13/315,555, filed Dec. 9, 2011, 46 pages.
(Continued)

*Primary Examiner* — Jorge L Carrasquillo
(74) *Attorney, Agent, or Firm* — Yee & Associates, P.C.

(57) ABSTRACT

An apparatus and method for resetting a motor controller. It is determined whether a tripping of the motor controller is accompanied by an undesired condition elsewhere in a power system wherein an alternating current bus receives alternating current power from a generator, a power converter converts the alternating current power on the alternating current bus to direct current power on a direct current bus, and the direct current power on the direct current bus powers the motor controller. In response to a determination that the tripping of the motor controller is accompanied by the undesired condition, it is determined whether the undesired condition is less than a threshold for more than a time delay. The motor controller is reset in response to a determination that the undesired condition is less than the threshold for more than the time delay.

8 Claims, 5 Drawing Sheets

(51) Int. Cl.
    *H02H 7/125*    (2006.01)
    *B60R 16/03*    (2006.01)
    *H02P 1/02*     (2006.01)

(56) References Cited

U.S. PATENT DOCUMENTS

| | | | |
|---|---|---|---|
| 5,508,875 A * | 4/1996 | Innes | H02H 3/04 |
| | | | 361/93.2 |
| 7,906,866 B2 | 3/2011 | Anghel et al. | |
| 8,164,866 B2 | 4/2012 | Vedula et al. | |
| 2003/0085678 A1 | 5/2003 | Yamada et al. | |
| 2005/0283277 A1* | 12/2005 | Schulz | E21B 41/0021 |
| | | | 700/282 |
| 2009/0184718 A1 | 7/2009 | Ivan et al. | |
| 2010/0117582 A1 | 5/2010 | Ogawa et al. | |
| 2010/0208393 A1 | 8/2010 | Vedula et al. | |
| 2013/0147412 A1 | 6/2013 | Solodovnik et al. | |

OTHER PUBLICATIONS

Extended European Search Report, dated Apr. 22, 2013, regarding Application No. EP12195064.6, 6 pages.
Office Action, dated Aug. 6, 2013, regarding U.S. Appl. No. 13/315,555, 19 pages.
Notice of Allowance, dated Feb. 14, 2014, regarding U.S. Appl. No. 13/315,555, 10 pages.

\* cited by examiner

RESETTING A MOTOR CONTROLLER FOR POWER SYSTEM PROTECTION

This application is a divisional of U.S. patent application Ser. No. 13/315,555, filed Dec. 9, 2011, which is incorporated by reference herein in its entirety.

BACKGROUND INFORMATION

1. Field

The present disclosure relates generally to electrical power systems, such as systems for providing electrical power for motors and other loads on an aircraft. The present disclosure relates more specifically to alternating current power systems equipped with direct current power conversion equipment for providing electrical power to direct current loads and to identifying conditions in such power systems and protecting such systems from undesired conditions in a coordinated manner.

2. Background

Aircraft may employ various electronic devices and systems to perform various functions on the aircraft. For example, without limitation, electric motors on an aircraft may be used to move flight control surfaces, to pressurize hydraulics, to pump fuel, and to perform other functions on the aircraft. Power for the electric motors and other electronic systems and devices on an aircraft may be provided by an aircraft power system.

Power systems in modern aircraft may be different from both traditional ground-based electrical utility power systems and traditional aircraft power systems in several ways. For example, without limitation, power systems in modern aircraft may employ direct current (DC) buses to power electric motors, motor controllers for the electric motors, and other DC loads on the aircraft. Power for the DC buses may be provided via a power converter configured to convert alternating current (AC) power on an AC bus to DC power on the DC buses. AC power is provided on the AC bus by a generator on the aircraft. On modern aircraft, the generated AC power is mainly consumed by loads connected to the DC buses and not by traditional AC loads. Voltage levels on the DC buses may be selected to reduce currents and weight associated with power distribution on the aircraft.

It is desirable to protect the components of an aircraft power system from undesirable conditions that may occur on the power system. However, due to the differences between traditional aircraft power systems and more modern systems, the methods for providing power system protection in traditional systems may not be used to provide the desired protection for more modern aircraft power systems.

Accordingly, it would be desirable to have a method and apparatus that takes into account one or more of the issues discussed above as well as possibly other issues.

SUMMARY

An embodiment of the present disclosure provides a method of resetting a motor controller. It is determined whether a tripping of the motor controller is accompanied by an undesired condition elsewhere in a power system. The power system comprises a generator, an alternating current bus, a power converter, and a direct current bus. The alternating current bus receives alternating current power from the generator. The power converter converts the alternating current power on the alternating current bus to direct current power on the direct current bus. The direct current power on the direct current bus powers the motor controller. In response to a determination that the tripping of the motor controller is accompanied by the undesired condition, it is determined whether the undesired condition is less than a threshold for more than a time delay. The motor controller is reset in response to a determination that the undesired condition is less than the threshold for more than the time delay.

An embodiment of the present disclosure also provides an apparatus comprising a condition detector and a controller. The condition detector is configured to determine whether a tripping of a motor controller is accompanied by an undesired condition elsewhere in a power system and whether the undesired condition is less than a threshold for more than a time delay. The power system comprises a generator, an alternating current bus, a power converter, and a direct current bus. The alternating current bus receives alternating current power from the generator. The power converter converts the alternating current power on the alternating current bus to direct current power on the direct current bus. The direct current power on the direct current bus powers the motor controller. The controller is configured to reset the motor controller in response to a determination that the tripping of the motor controller is accompanied by the undesired condition and a determination that the undesired condition is less than the threshold for more than the time delay.

An embodiment of the present disclosure also provides a method of protecting a power system. An unbalanced voltage condition on an alternating current bus is identified. The alternating current bus receives alternating current power from a generator. A power converter converts the alternating current power on the alternating current bus to direct current power on a direct current bus. The direct current power on the direct current bus powers a motor controller. The power converter is disconnected from the alternating current bus in response to identifying the unbalanced voltage condition. It is determined whether the unbalanced voltage condition is less than a threshold for more than a time delay. The power converter is reconnected to the alternating current bus in response to a determination that the unbalanced voltage condition is less than the threshold for more than the time delay. It is determined whether the motor controller is tripped. The motor controller is reset in response to a determination that the motor controller is tripped and the determination that the unbalanced voltage condition is less than the threshold for more than the time delay.

The features and functions of the embodiments can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof will best be understood by reference to the following detailed description of illustrative embodiments of the present disclosure when read in conjunction with the accompanying drawings, wherein:

DETAILED DESCRIPTION

The different illustrative embodiments recognize and take into account a number of different considerations. "A number", as used herein with reference to items, means one or more items. For example, "a number of different considerations" means one or more different considerations.

The different illustrative embodiments recognize and take into account that it is desirable to provide safe operation of a power system on an aircraft in the event that undesired conditions occur in the power system. The different illustrative embodiments recognize and take into account that it is desirable to provide robust and coordinated protection for aircraft power systems.

The different illustrative embodiments recognize and take into account that it is desirable that aircraft power system protection is robust. It is desirable that normal transients in the power system should not cause power to the loads to be interrupted. Therefore, it is desirable that such normal transients should not cause false indications of undesirable conditions in the power system.

The different illustrative embodiments also recognize and take into account that protection of the power system on an aircraft should be coordinated. Causes of undesired conditions in the power system upstream, or closer to the generator, from where the undesired condition is detected should not result in power being cut off to the loads at a point in the power system downstream, or further from the generator, from where the undesired condition is detected. Furthermore, it is desirable that when the cause of an undesired condition in the power system is downstream from where the undesired condition is detected, appropriate action should be taken within the power system at a point close to the cause of the undesired condition. By taking appropriate action at a point close to the cause of the undesired condition, the undesired condition may be isolated without affecting other parts of the power system unnecessarily.

The different illustrative embodiments also recognize and take into account that undesired conditions that may be caused by AC to DC power conversion equipment on an aircraft may not be present in traditional AC power systems. For example, without limitation, such undesired conditions may result from a short or open circuit of the power diode rectifiers in passive or active AC to DC converters on the aircraft.

In this case, undesired conditions in the power system on the aircraft may include DC current in the AC current waveform. Excessive DC current in the AC system may lead to saturation of magnetic devices in the system, such as transformers, autotransformers, generators, and other magnetic devices. Excessive DC current in the AC system also may lead to the saturation of current sensors. The presence of excessive DC current in an AC power system may lead to degraded power quality characteristics. For example, the presence of excessive DC current in the AC power system may lead to excessive ripple voltages and currents, excessive harmonic distortions, other undesired power quality characteristics, or combinations of various undesired power quality characteristics. Furthermore, the presence of excessive DC current may prevent AC contactors or circuit breakers from being opened properly.

Therefore, illustrative embodiments provide a system and method for protecting a power system that includes a generator for providing AC power on an AC bus and a power converter for converting the AC power on the AC bus to DC power on a DC bus. The DC power on the DC bus powers a number of loads. An undesired condition may be identified at the input to the power converter from the AC bus. The undesired condition may include one or more of a variety of undesired conditions or combinations of undesired conditions. The undesired condition may be caused by at least one of the power converter, the DC bus, or the loads. The power converter is disconnected from the AC bus to protect the power system in response to identifying the undesired condition that persists for at least a time delay.

The time delay is selected to prevent power from being disconnected to the loads in response to normal transients in the power system that are not truly undesired conditions. The time delay is also selected such that the power converter is disconnected from the AC bus before the AC bus is disconnected from the generator due to the undesired condition. The time delay thus is selected such that appropriate action is taken in response to identifying an undesired condition at a point in the power system close to the cause of the undesired condition. In this manner, power may be removed only from loads that are close to the cause of the undesired condition in the power system.

Figure 1:
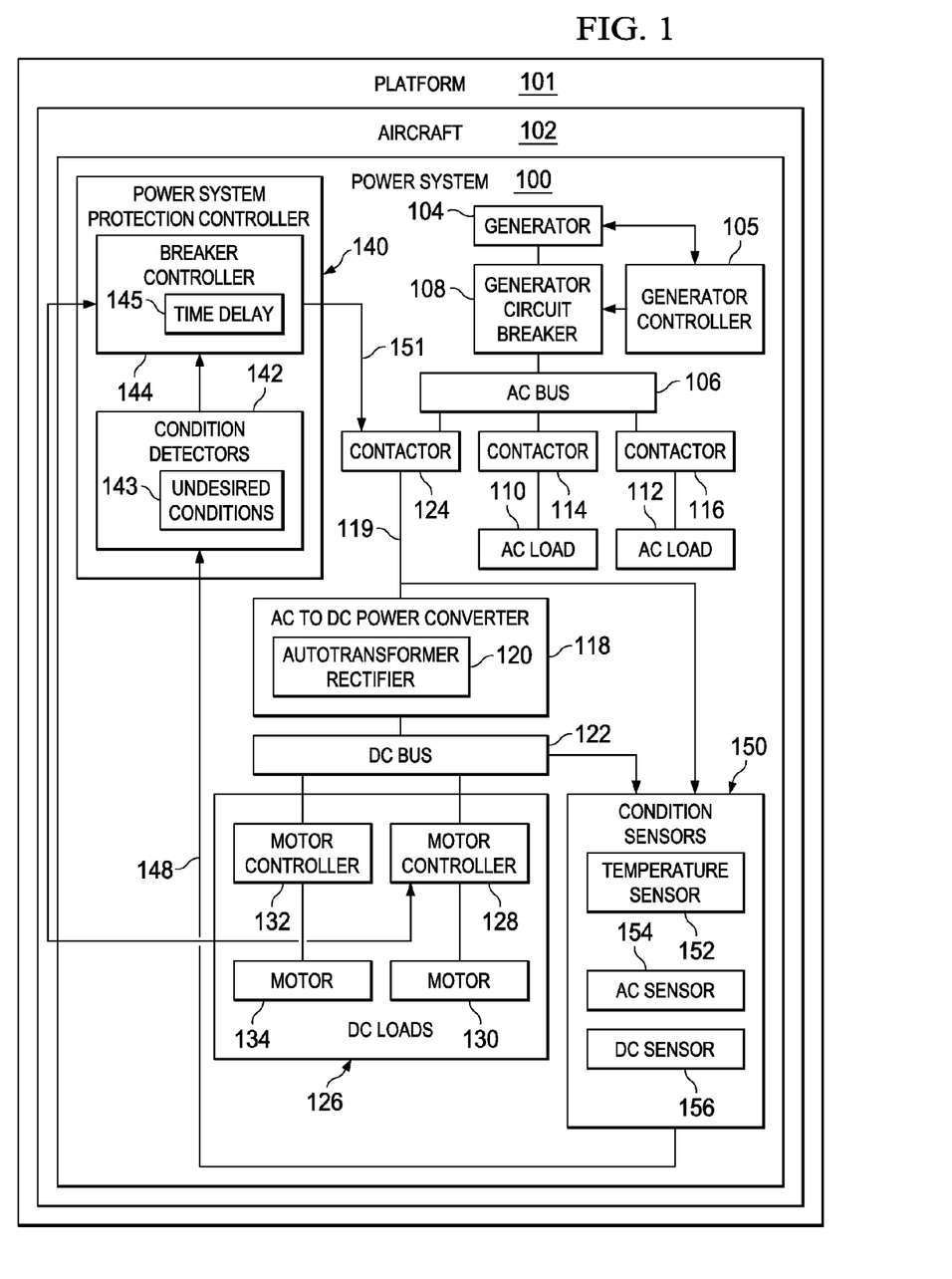
FIG. 1 is an illustration of a block diagram of a power system in accordance with an illustrative embodiment.

Turning to FIG. 1, an illustration of a block diagram of a power system is depicted in accordance with an illustrative embodiment. In accordance with an illustrative embodiment, power system 100 is a power system on or for platform 101. For example, without limitation, platform 101 may be aircraft 102. In other embodiments, platform 101 may be another fixed or mobile structure. For example, platform 101 may be any vehicle for traveling through the air, in space, over land, on water, or under water.

Power system 100 includes generator 104. For example, generator 104 may generate variable frequency three-phase AC power on AC bus 106.

Generator circuit breaker 108 may be provided between generator 104 and AC bus 106. Generator circuit breaker 108 may comprise any structure that may be controlled to disconnect generator 104 from AC bus 106.

Generator controller 105 may control the operation of generator 104 and generator circuit breaker 108. For example, generator controller 105 may control the operation of generator 104 and open generator circuit breaker 108 to protect power system 100 from an undesired condition occurring in power system 100. When generator circuit breaker 108 is opened to protect power system 100, power from generator 104 will be cut off to all of the loads in power system 100.

A number of AC loads 110 and 112 may be powered from AC bus 106. Contactors 114 and 116, respectively, may be provided between AC loads 110 and 112 and AC bus 106. Any number of AC loads and associated contactors may be connected to receive power from AC bus 106.

A specific AC load that may be connected to AC bus 106 is AC to DC power converter 118. AC to DC power converter 118 converts AC power on AC bus 106 to DC power on DC bus 122. For example, without limitation, DC power on DC bus 122 may be derived from variable frequency three-phase AC power or other AC power on AC bus 106 that is provided on input 119 to AC to DC power converter 118. For example, without limitation, AC to DC power converter 118 may include autotransformer rectifier 120 or any other structure for converting AC power on AC bus 106 to DC power on DC bus 122.

Contactor 124 may be provided on input 119, between AC bus 106 and AC to DC power converter 118. Contactors 114, 116, and 124 may be implemented as independently controllable circuit breakers using any structures that may be controlled to open to disconnect AC bus 106 from AC loads 110 and 112 and AC to DC power converter 118, respectively. Contactors 114, 116, and 124 also may be controlled to close to reconnect AC bus 106 to AC loads 110 and 112 and AC to DC power converter 118, respectively.

DC loads 126 may be powered by the DC power on DC bus 122. For example, without limitation, DC loads 126 may include motor controller 128, motor 130, motor controller 132, and motor 134. In alternative embodiments, DC loads 126 connected to DC bus 122 may include a single motor and motor controller or more than two motors and motor controllers. In another alternative embodiment, DC loads 126 may comprise additionally or alternatively a number of DC loads other than motors and motor controllers.

Motors 130 and 134 may be any type of electric motor. For example, without limitation, motors 130 and 134 may be induction motors, permanent magnet motors, synchronous motors with independent excitation, or any other type of electric motor. Motors 130 and 134 may be the same or different types of motors.

Motor controllers 128 and 132 may be any type of motor controllers that are appropriate for controlling motors 130 and 134, respectively. Depending on the type of motor to be controlled, motor controllers 128 and 132 may be of any appropriate size and complexity. In one example, motor controller 128, motor controller 132, or both may be solid state multifunctional motor controllers that provide power conversion for driving motor 130 or motor 134, respectively. A motor controller of this type may be used to drive various types of motors and motor loads.

In accordance with an illustrative embodiment, safe operation of power system 100 in the event of undesired conditions in power system 100 is provided by power system protection controller 140. Power system protection controller 140 includes condition detectors 142 and breaker controller 144.

Condition detectors 142 are configured to identify undesired conditions 143 in power system 100. As will be described in more detail below, undesired conditions 143 may include a variety of undesired conditions and combinations of undesired conditions. In accordance with an illustrative embodiment, undesired conditions 143 may be identified by condition detectors 142 at input 119 to AC to DC power converter 118 from AC bus 106. Undesired conditions 143 may be caused by one or more of AC to DC power converter 118, DC bus 122, and DC loads 126. That is to say, undesired conditions 143 may be caused by an event or condition in one or more of AC to DC power converter 118, DC bus 122, and DC loads 126. In other words, undesired conditions 143 may be said to be caused downstream from input 119 to AC to DC power converter 118 at which point undesired conditions 143 are identified.

Condition detectors 142 may be configured to identify undesired conditions 143 in power system 100 using sensor signals 148 provided by condition sensors 150. Condition sensors 150 may be implemented using various devices for sensing various conditions of interest at various points in power system 100. The implementation of condition sensors 150 in any particular embodiment will depend upon undesired conditions 143 to be identified. For example, without limitation, condition sensors 150 may include temperature sensor 152, AC sensor 154, and DC sensor 156. Temperature sensor 152 may be used to identify a temperature of AC to DC power converter 118. AC sensor 154 may be used to identify current, voltage, or both current and voltage at input 119 to AC to DC power converter 118, on AC bus 106, or both. DC sensor 156 may be used to identify DC voltage on DC bus 122.

In accordance with an illustrative embodiment, breaker controller 144 is configured to disconnect AC to DC power converter 118 from AC bus 106 in response to a determination by condition detectors 142 that one or more undesired conditions 143 is identified in power system 100. For example, without limitation, breaker controller 144 may disconnect AC to DC power converter 118 from AC bus 106 by sending signal 151 to open contactor 124.

In accordance with an illustrative embodiment, breaker controller 144 is configured to disconnect AC to DC power converter 118 from AC bus 106 in response to one or more undesired conditions 143 that are identified to persist for at least time delay 145. Time delay 145 may include one or more lengths of time. Time delay 145 may be selected based upon undesired conditions 143 in response to which AC to DC power converter 118 is to be disconnected from AC bus 106. In any case, time delay 145 preferably is selected to prevent power from being disconnected from DC loads 126 in response to normal transients in power system 100 that are not truly undesired conditions 143.

Generator circuit breaker 108 may be configured or controlled to disconnect generator 104 from AC bus 106 to protect power system 100 in response to certain conditions in power system 100. In some cases, these certain conditions may be undesired conditions 143 or may result from undesired conditions 143 that are caused downstream from input 119 to AC to DC power converter 118. In these cases, disconnecting generator 104 from AC bus 106 will unnecessarily remove power to AC loads 110 and 112 connected to AC bus 106. In accordance with an illustrative embodiment, time delay 145 is also selected such that AC to DC power converter 118 is disconnected from AC bus 106 before AC bus 106 is disconnected from generator 104 due to undesired conditions 143. Time delay 145 thus is selected such that appropriate action is taken in response to identifying undesired conditions 143 at a point in power system 100 close to the cause of undesired conditions 143. In this manner, power may be removed only from loads that are close to the cause of undesired conditions 143 in power system 100.

Breaker controller 144 also may be configured to reconnect AC to DC power converter 118 to AC bus 106 in response to a determination that undesired conditions 143 are no longer occurring. For example, without limitation, breaker controller 144 may reconnect AC to DC power converter 118 to AC bus 106 by sending signal 151 to close contactor 124. Breaker controller 144 also may be configured to restart one or more of motor controllers 128 and 132 in response to the determination that undesired conditions 143 are no longer occurring.

The illustration of FIG. 1 is not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example, the functions performed by power system protection controller 140 may be implemented in a centralized manner at one location in power system 100 or may be implemented in a distributed manner at various locations in power system 100. Some or all of the functions performed by power system protection controller 140 may be implemented along with other control functions performed at various locations in power system 100. For example, without limitation, some of the functions performed by power system protection controller 140 may be implemented as part of generator controller 105.

The functions performed by power system protection controller 140 as described herein may be implemented in hardware or in hardware and software. In cases where the functions performed by power system protection controller 140 are implemented in hardware and software, power system protection controller 140 may include a programmable processor unit for running the software to perform the functions. For example, without limitation, the processor unit may be a microprocessor, other processor unit, or a combination of processor units. Such a processor unit may be provided in either a general or special purpose computer or other computing device.

The processor unit may serve to run instructions for software that may be loaded into memory, persistent storage, or both. The processor unit may be a number of processors, a multi-processor core, or some other type of processor, depending on the particular implementation. Further, the processor unit may be implemented using a number of heterogeneous processor systems in which a main processor is present with secondary processors on a single chip. As another illustrative example, the processor unit may be a symmetric multi-processor system containing multiple processors of the same type.

The processes of the different embodiments may be performed by the processor unit using software in the form of computer-implemented instructions. Instructions for controlling the processor unit to perform the desired functions in accordance with illustrative embodiments may be located in storage devices which are in communication with the processor unit. For example, without limitation, the instructions may be in a functional form on persistent storage. These instructions may be loaded into memory for execution by the processor unit.

These instructions may be referred to as program instructions, program code, computer usable program code, or computer readable program code that may be read and executed by the processor unit. The program code in the different embodiments may be embodied on different physical or computer readable storage media, such as memory or persistent storage.

In another illustrative example, the functionality of power system protection controller 140 may be implemented in a hardware unit that has circuits that are manufactured or configured for a particular use. This type of hardware may perform operations without needing program code to be loaded into a memory from a storage device to be configured to perform the operations.

For example, without limitation, such a hardware unit may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code may be omitted, because the processes for the different embodiments are implemented in a hardware unit.

In still another illustrative example, the functionality provided by power system protection controller 140 may be implemented using a combination of processors found in computers and hardware units. Power system protection controller 140 may include a number of hardware units and a number of processors that are configured to perform the desired functions. In this example, some of the functionality provided by power system protection controller 140 may be implemented in the number of hardware units while other processes may be implemented in the number of processors.

In yet another illustrative example, the functionality provided by power system protection controller 140 may be implemented using discrete circuit components, either alone or in combination with hardware units, processor units, or both.

Figure 2:
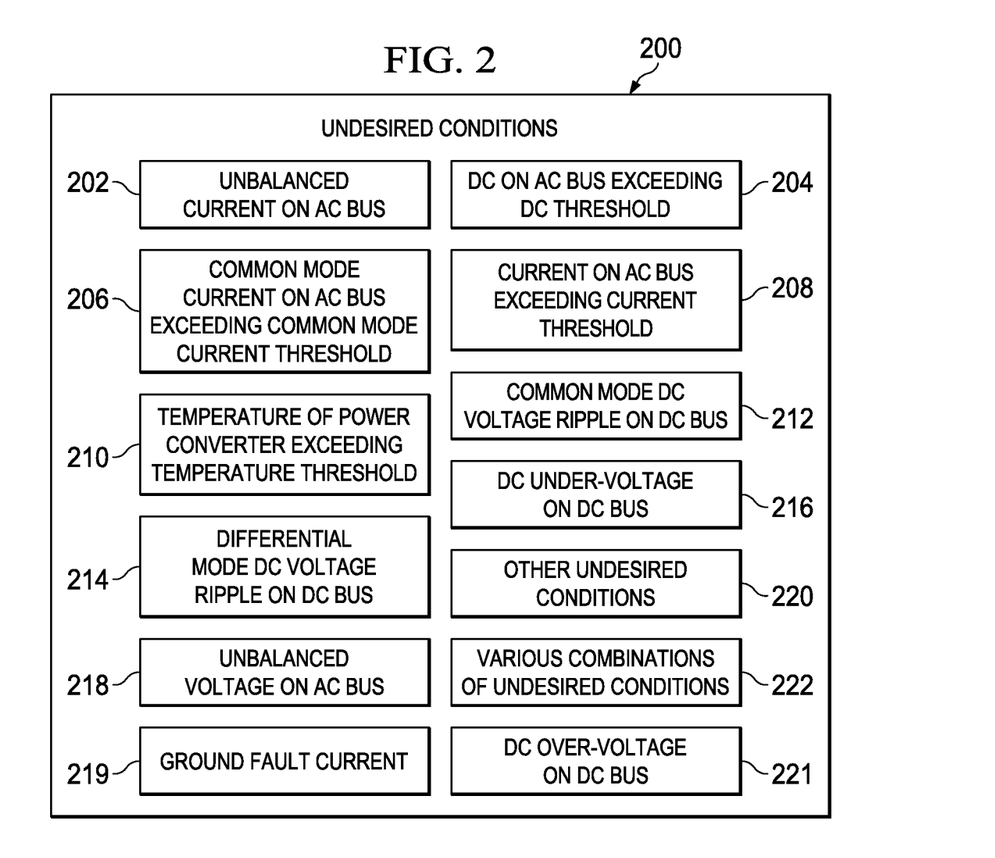
FIG. 2 is an illustration of a block diagram of undesired conditions in a power system in accordance with an illustrative embodiment.

Turning now to FIG. 2, an illustration of a block diagram of undesired conditions in a power system is depicted in accordance with an illustrative embodiment. In this example, undesired conditions 200 are examples of undesired conditions 143 in power system 100 in FIG. 1. Undesired conditions 200 are examples of undesired conditions in a power system in which a generator provides AC power to an AC bus and AC power on the AC bus is converted by a power converter to DC power on a DC bus to power a load.

Undesired conditions 200 may include one or more of unbalanced current on the AC bus 202, DC on the AC bus exceeding a DC threshold 204, common mode current on the AC bus exceeding a common mode current threshold 206, current on the AC bus exceeding a current threshold 208, temperature of the power converter exceeding a temperature threshold 210, common mode DC voltage ripple on the DC bus 212, differential mode DC voltage ripple on the DC bus 214, DC under-voltage on the DC bus 216, unbalanced voltage on the AC bus 218, ground fault current 219, DC over-voltage on the DC bus 221, other undesired conditions 220, or various combinations of undesired conditions 222.

Figure 3A:
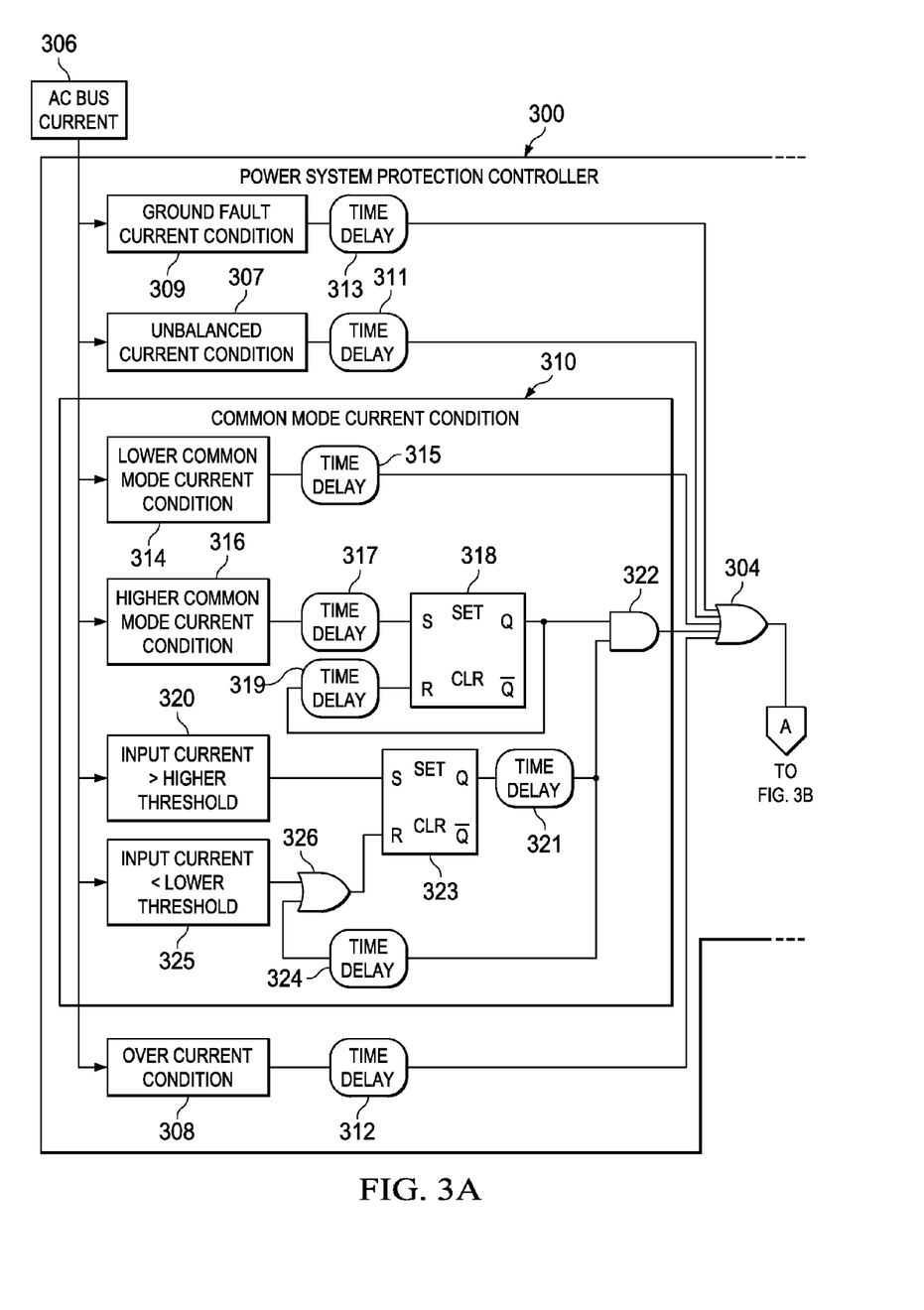
FIG. 3A and FIG. 3B together are an illustration of a logic diagram of a power system protection controller in accordance with an illustrative embodiment.
Figure 3B:
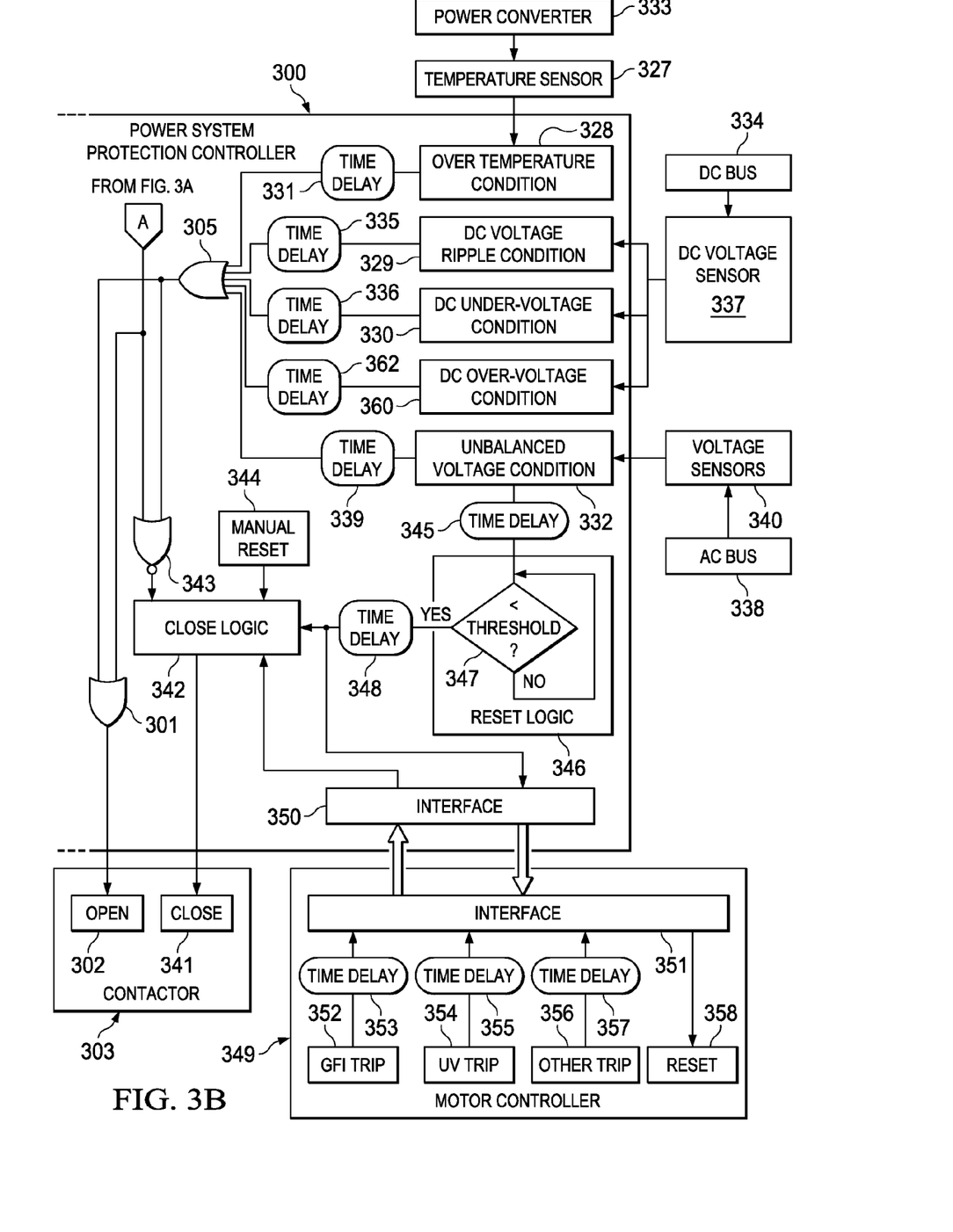

Turning now to FIG. 3A and FIG. 3B, an illustration of a logic diagram of a power system protection controller is depicted in accordance with an illustrative embodiment. In this example, power system protection controller 300 is an example of one implementation of power system protection controller 140 in FIG. 1. The illustration of FIG. 3A and FIG. 3B is provided to illustrate in more detail the functionality of one example of a power system protection controller in accordance with an illustrative embodiment. The illustration of FIG. 3A and FIG. 3B is not intended to illustrate an actual hardware implementation of a power system protection controller in accordance with an illustrative embodiment or to limit the illustrative embodiments to any particular implementation.

In accordance with an illustrative embodiment, power system protection controller 300 provides an output from OR operation 301 to open 302 contactor 303. Contactor 303 is positioned between an AC bus and a power converter so that when contactor 303 is open 302 the power converter is disconnected from the AC bus. OR operation 301 receives input from OR operation 304 and OR operation 305. The inputs to OR operation 304 will first be discussed in detail with reference to FIG. 3A.

The inputs to OR operation 304 are related to undesired conditions in a power system that are identified based on current at the input to the power converter from the AC bus. This current may be referred to as AC bus current 306 at the input to the power converter. AC bus current 306 may be sensed using an appropriate AC sensor at the input to the power converter. For example, without limitation, AC bus current 306 may be sensed using an AC transformer, a Hall Effect sensor, or another appropriate AC sensor.

Undesired conditions in the power system that may be identified using AC bus current 306 at the input to the power converter may be caused, for example, by positive or negative DC rail to ground conditions in the DC bus, by shorts of the common mode capacitors in the output filters of the AC to DC power converter or in the input filters of motor controllers connected to the DC bus, or by a short or open circuit condition of power diodes in the AC to DC power converter. Each of these causes has unique characteristics and result in different amounts of DC in the AC waveform at the AC input to the AC to DC power converter.

In this example, without limitation, undesired conditions in the power system that may be identified by power system protection controller 300 using AC bus current 306 at the input to the power converter include unbalanced current condition 307, over current condition 308, ground fault current condition 309, and common mode current condition 310.

Unbalanced current condition 307 is identified as an unbalanced current in the AC input to the AC to DC power converter. Unbalanced current condition 307 may be identified from AC bus current 306 at the input to the power converter. If unbalanced current condition 307 is identified in the power system for at least a time period defined by time delay 311, then contactor 303 may be controlled via OR operation 304 and OR operation 301 to open 302 to disconnect the AC to DC power converter from the AC bus. In one example, without limitation, time delay 311 may be about 400 milliseconds or another suitable time period.

Over current condition 308 is identified as a current in the AC input to the AC to DC power converter that exceeds an over current threshold. Over current condition 308 may be identified from AC bus current 306 at the input to the power converter. If over current condition 308 is identified in the power system for at least a time period defined by time delay 312, then contactor 303 may be controlled via OR operation 304 and OR operation 301 to open 302 to disconnect the AC to DC power converter from the AC bus. In one example, without limitation, time delay 312 may be defined by a time delay curve function such that time delay 312 is shorter for over current condition 308 where the over current threshold is exceeded by a larger amount and such that time delay 312 is longer for over current condition 308 where the over current threshold is exceeded by a smaller amount.

Ground fault current condition 309 may be identified as a ground fault current in the AC bus. If ground fault current condition 309 is identified in the power system for at least a time period defined by time delay 313, then contactor 303 may be controlled via OR operation 304 and OR operation 301 to open 302 to disconnect the AC to DC power converter from the AC bus.

Common mode current condition 310 may be defined by lower common mode current condition 314 and higher common mode current condition 316. Lower common mode current condition 314 and higher common mode current condition 316 may be identified from AC bus current 306 sensed at the input to the power converter. Lower common mode current condition 314 is identified as a common mode current at the input to the power converter that exceeds a lower common mode current threshold. Higher common mode current condition 316 is identified as a common mode current at the input to the power converter that exceeds a higher common mode current threshold. The lower common mode current threshold is lower than the higher common mode current threshold. For example, without limitation, lower common mode current condition 314 may be identified as a common mode current exceeding about 5 Amps rms or another suitable current level. In this example, without limitation, higher common mode current condition 316 may be identified as a common mode current exceeding about 10 Amps rms or another suitable current level that is higher than the current level for identifying lower common mode current condition 314. The higher common mode current threshold may be referred to as a first common mode current threshold. The lower common mode current threshold may be referred to as a second common mode current threshold. In this example, higher common mode current condition 316 provides faster ground fault protection for the power system and lower common mode current condition 314 provides slower ground fault protection for the power system.

If lower common mode current condition 314 is identified in the power system for at least a time period defined by time delay 315, then contactor 303 may be controlled via OR operation 304 and OR operation 301 to open 302 to disconnect the AC to DC power converter from the AC bus. In one example, without limitation, time delay 315 may be about 35 seconds or another suitable time period.

If higher common mode current condition 316 is identified in the power system for at least a time period defined by time delay 317, then contactor 303 may be controlled via OR operation 304 and OR operation 301 to open 302 to disconnect the AC to DC power converter from the AC bus. In one example, without limitation, time delay 317 may be about 0.2 milliseconds or another suitable time period. In any case, in this example, time delay 315 may be longer than time delay 317.

Latch function 318 may be used to retain the signal provided to open contactor 303 that results from higher common mode current condition 316 for a sufficient duration to open contactor 303. The output of latch function 318 is set, thereby providing a signal to open contactor 303, in response to higher common mode current condition 316 that exceeds time delay 317. To ensure adequate protection of the power system when higher common mode currents are identified, time delay 317 may be relatively short. However, once set, the output of latch function 318 to open contactor 303 is not reset until after further time delay 319. In one example, without limitation, time delay 319 may be about 15 milliseconds to about 45 milliseconds or another suitable time period.

In accordance with an illustrative embodiment, disconnecting the AC to DC power converter from the AC bus in response to higher common mode current condition 316 may be subject to the overall level of input current at the input to the AC to DC power converter at the same time. The overall level of current to the power converter may be determined from AC bus current 306 at the input to the power converter. In accordance with one example, the AC to DC power converter may be disconnected from the AC bus in response to higher common mode current condition 316 only if, at the same time, input current is greater than higher threshold 320 for at least time delay 321. For example, without limitation, the higher threshold for determining input current is greater than higher threshold 320 may be about 300 Amps rms or another suitable amount. For example, without limitation, time delay 321 may be about 10 milliseconds or another suitable time period. In this example, AND operation 322 is used to prevent disconnecting the power converter from the AC bus in cases where higher common mode current condition 316 and input current is greater than higher threshold 320 are not simultaneously identified.

Latch function 323 may be used to latch the determination that input current is greater than higher threshold 320. The output of latch function 323, provided to AND operation 322 via time delay 321, may be reset after time delay 324 or sooner if it is determined that input current is less than lower threshold 325. This reset function is implemented by OR operation 326. In this example, without limitation, time delay 324 may be about 15 milliseconds to about 45 milliseconds or another suitable time period. In this example, without limitation, the lower threshold for determining input current is less than lower threshold 325 may be about 250 Amps rms or another suitable amount. In any case, the lower threshold for determining input current is less than lower threshold 325 is less than the higher threshold for determining input current is greater than higher threshold 320.

In accordance with an illustrative embodiment, voltage regulation by a generator controller in the power system, such as generator controller 105 in FIG. 1, may reduce the AC voltage level when DC is present in the AC waveform. This voltage foldback allows contactor 303 between the AC bus and the AC to DC power converter to be able to break current when DC is present. As the level of DC through contactor 303 increases, it becomes increasingly more difficult to break the current. As the level of DC through contactor 303 increases beyond a certain level, the current through contactor 303 does not cross zero. Therefore, arcing between the contacts of contactor 303 may not stop when contactor 303 is open 302 and, as a result, current through contactor 303 is not interrupted. Voltage foldback reduces the likelihood that current through contactor 303 is not interrupted when contactor 303 is open 302 in response to identifying an undesired condition.

The voltage foldback provided by the generator controller also reduces the amount of current sensed at the AC input to the AC to DC power converter. In accordance with an illustrative embodiment, power system protection controller 300 preferably takes into account the characteristics of the voltage foldback provided by the generator controller.

Turning now to FIG. 3B, in this example, inputs to OR operation 305 that cause contactor 303 to open 302 to disconnect the power converter from the AC bus comprise over temperature condition 328, DC voltage ripple condition 329, DC under-voltage condition 330, DC over-voltage condition 360, and unbalanced voltage condition 332.

Over temperature condition 328 may be identified when the temperature of the AC to DC power converter exceeds a temperature threshold for at least time delay 331. Over temperature condition 328 may be identified from temperature information provided by temperature sensor 327 in power converter 333. If over temperature condition 328 is identified for at least a time period defined by time delay 331, then contactor 303 may be controlled via OR operation 305 and OR operation 301 to open 302 to disconnect the AC to DC power converter from the AC bus.

DC voltage ripple condition 329 may be identified as excessive ripple in the DC voltage in DC bus 334 for at least time delay 335. DC voltage ripple condition 329 may be identified from voltage information provided by DC voltage sensor 337 in DC bus 334. If DC voltage ripple condition 329 is identified for at least a time period defined by time delay 335, then contactor 303 may be controlled via OR operation 305 and OR operation 301 to open 302 to disconnect the AC to DC power converter from the AC bus.

DC under-voltage condition 330 may be identified as a DC voltage level in DC bus 334 that is less than an under-voltage threshold for at least time delay 336. DC under-voltage condition 330 may be identified from voltage information provided by DC voltage sensor 337 in DC bus 334. If DC under-voltage condition 330 is identified for at least a time period defined by time delay 336, then contactor 303 may be controlled via OR operation 305 and OR operation 301 to open 302 to disconnect the AC to DC power converter from the AC bus.

DC over-voltage condition 360 may be identified as a DC voltage level in DC bus 334 that is greater than an over-voltage threshold for at least time delay 362. DC over-voltage condition 360 may be identified from voltage information provided by DC voltage sensor 337 in DC bus 334. If DC over-voltage condition 360 is identified for at least a time period defined by time delay 362, then contactor 303 may be controlled via OR operation 305 and OR operation 301 to open 302 to disconnect the AC to DC power converter from the AC bus.

Unbalanced voltage condition 332 may be identified as unbalanced voltage in AC bus 338 for at least time delay 339. Unbalanced voltage condition 332 may be determined from voltage information provided by voltage sensors 340 in AC bus 338. If unbalanced voltage condition 332 is identified for at least a time period defined by time delay 339, then contactor 303 may be controlled via OR operation 305 and OR operation 301 to open 302 to disconnect the AC to DC power converter from the AC bus. In one example, without limitation, time delay 339 may be about 250 milliseconds or another suitable time period.

In accordance with an illustrative embodiment, power system protection controller 300 also may close 341 contactor 303. Closing of contactor 303 reconnects the AC to DC power converter to the AC bus. Closing of contactor 303 may be controlled by close logic 342. Close logic 342 may close 341 contactor 303 in response to a determination that no undesired conditions continue to occur, as indicated by the output of NOR operation 343. Additionally, close logic 342 may close 341 contactor 303 in response to manual reset 344.

Close logic 342 may close 341 contactor 303 if contactor 303 was open 302 due to unbalanced voltage condition 332 and unbalanced voltage condition 332 is reduced by a sufficient amount for a sufficient duration. For example, unbalanced voltage condition 332 may be provided via time delay 345 to reset logic 346. For example, without limitation, time delay 345 may be greater than about 20 milliseconds or another suitable time period. Reset logic 346 determines whether unbalanced voltage condition 332 is less than threshold 347. After determining that unbalanced voltage condition 332 is less than threshold 347 for at least time delay 348, close logic 342 may close 341 contactor 303. For example, without limitation, time delay 348 may be about 50 milliseconds or another suitable time period.

Power system protection controller 300 also may reset motor controller 349. Power system protection controller 300 may be in communication with motor controller 349 via interface 350 in power system protection controller 300 and interface 351 in motor controller 349. Motor controller 349 may indicate ground fault interrupt trip 352 to power system protection controller 300 after time delay 353. Motor controller 349 may indicate under-voltage trip 354 to power system protection controller 300 after time delay 355. Motor controller 349 may indicate other trip 356 to power system protection controller 300 after time delay 357. Motor controller 349 may trip due to undesired conditions elsewhere in the power system, which is not desirable.

In accordance with an illustrative embodiment, power system protection controller 300 may send a signal to motor controller 349 via interface 350 and interface 351 to reset 358 motor controller 349 if the tripping of motor controller 349 was accompanied by unbalanced voltage condition 332. In this case, motor controller 349 may be reset 358 by power system protection controller 300 after unbalanced voltage condition 332 is reduced by a sufficient amount for a sufficient duration. For example, motor controller 349 may be reset 358 by power system protection controller 300 after determining that unbalanced voltage condition 332 is less than threshold 347 for at least time delay 348. If the tripping of motor controller 349 was not accompanied by unbalanced voltage condition 332, then motor controller 349 is not reset 358 by power system protection controller 300. In this case, motor controller 349 may have been tripped by a failure in its system and should not be reset to prevent undesirable operation.

Figure 4:
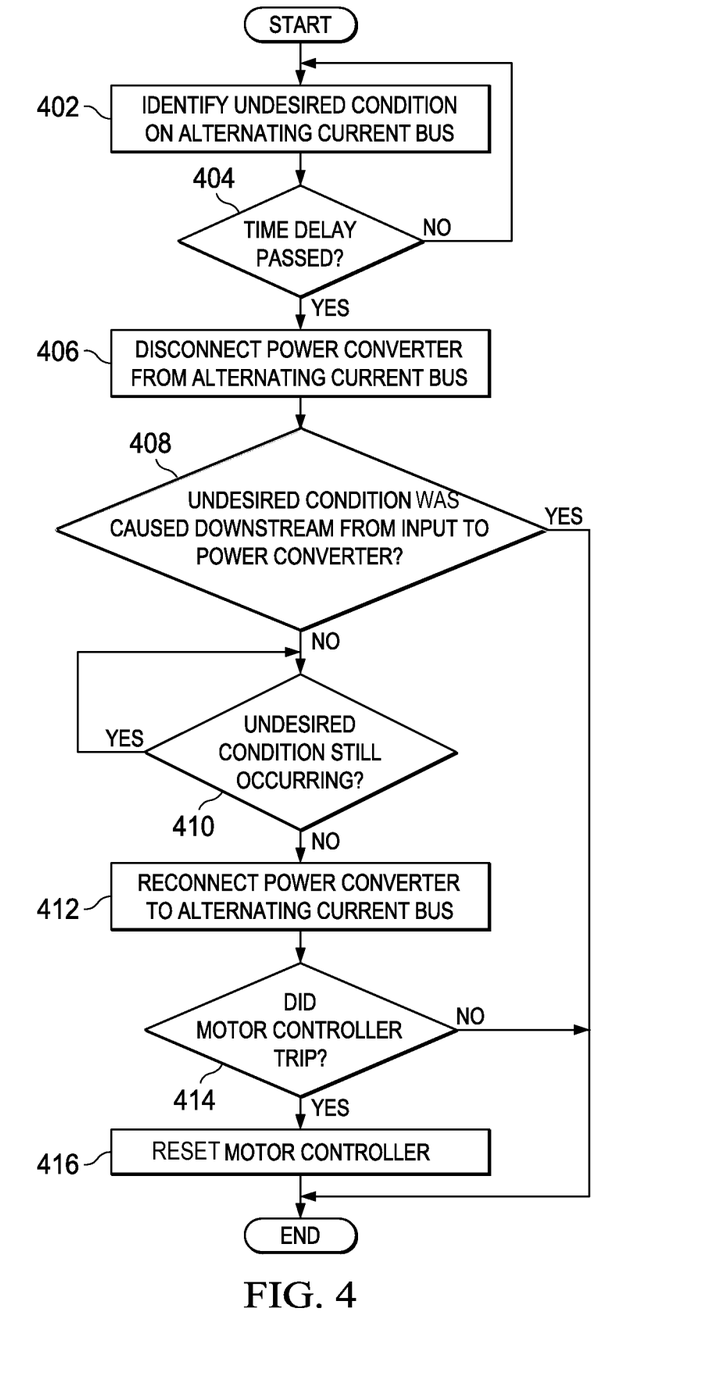
FIG. 4 is an illustration of a flowchart of a process for protecting a power system in accordance with an illustrative embodiment.

Turning now to FIG. 4, an illustration of a flowchart of a process for protecting a power system is depicted in accordance with an illustrative embodiment. For example, without limitation, the process of FIG. 4 may be performed by power system protection controller 140 in FIG. 1.

The process begins with identifying an undesired condition on the AC bus at the input to the power converter in the power system (operation 402). It then may be determined whether the undesired condition persists until a time delay associated with the undesired condition has passed (operation 404). If the time delay has not passed, the undesired condition may continue to be identified until the time delay has passed. When the time delay has passed, and the undesired condition continues, the power converter may be disconnected from the AC bus (operation 406). For example, operation 406 may include opening a contactor between the power converter and the AC bus.

It then may be determined whether the undesired condition was caused downstream from the input to the power converter from the AC bus (operation 408). If the undesired condition was caused downstream from the input to the power converter, the process terminates. If the undesired condition was not caused downstream from the input to the power converter it may be determined whether the undesired condition is still occurring (operation 410). Operation 410 may be repeated until it is determined that the undesired condition is no longer occurring. When it is determined that the undesired condition is no longer occurring, the power converter may be reconnected to the AC bus (operation 412). For example, operation 412 may include closing a contactor between the power converter and the AC bus.

It then may be determined whether a motor controller was tripped (operation 414). If it is determined that a motor controller was not tripped the process terminates. If it is determined that a motor controller was tripped, the motor controller may be reset (operation 416) with the process terminating thereafter.

The different illustrative embodiments described herein provide methods for identifying undesired conditions and providing coordinated protection in three-phase AC power systems equipped with DC power conversion equipment for providing power to multifunctional motor controllers. In accordance with illustrative embodiments, an undesired condition on an AC bus that is caused by at least one of an undesired condition on an AC to DC power converter, an undesired condition on the DC bus, or an undesired condition on a load powered by the DC bus is identified. The power converter is disconnected from the AC bus to protect the power system in response to identifying the undesired condition. The different illustrative embodiments thereby provide for safe operation of the power system on an aircraft in the event of undesired conditions in the power system.

Power system protection in accordance with illustrative embodiments is robust. In accordance with the illustrative embodiments, normal transients in the power system may not result in false indications of undesired conditions. Therefore, such normal transients may not cause power system protection in accordance with the illustrative embodiments to interrupt power to the loads being powered by the power system.

Power system protection in accordance with the illustrative embodiments also is coordinated. Undesired conditions in the power system that are caused upstream from the DC power system protection described herein may not activate the power system protection. Undesired conditions in the power system that are caused downstream from the DC power system protection described herein may result in activation of only a single protective device closest to the cause of the identified undesired condition. This coordination ensures that only the area of the power system containing the cause of the undesired condition is isolated from the rest of the power system. Therefore, the number of loads affected by the response to the undesired condition is minimized and the number of available power sources is maximized.

The flowcharts and block diagrams in the different depicted embodiments illustrate the structure, functionality, and operation of some possible implementations of apparatuses and methods in different illustrative embodiments. In this regard, each block in the flowcharts or block diagrams may represent a module, segment, function, or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

The description of the different illustrative embodiments has been presented for purposes of illustration and description and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of resetting a motor controller, the method comprising:
   identifying an unbalanced voltage condition on an alternating current bus;
   disconnecting a power converter from the alternating current bus in response to identifying the unbalanced voltage condition for at least a time period selected such that the power converter is disconnected before the alternating current bus is disconnected from a generator due to the unbalanced voltage condition;

determining whether a tripping of the motor controller is accompanied by the unbalanced voltage condition in a power system, wherein the power system comprises the generator, the alternating current bus, a power converter, and a direct current bus, and wherein the alternating current bus receives alternating current power from the generator, the power converter converts the alternating current power on the alternating current bus to direct current power on the direct current bus, and the direct current power on the direct current bus powers the motor controller;

determining, in response to a determination that the tripping of the motor controller is accompanied by the unbalanced voltage condition, whether the unbalanced voltage condition is less than a threshold for more than a time delay;

resetting the motor controller in response to a determination that the unbalanced voltage condition is less than the threshold for more than the time delay;

reconnecting the power converter to the alternating current bus in response to the determination that the unbalanced voltage condition is less than the threshold for more than the time delay.

2. The method of claim 1, wherein the unbalanced voltage condition was not caused downstream from an input to the power converter.

3. The method of claim 1, wherein the motor controller comprises a solid state multifunctional motor controller configured to control a motor selected from a group of motors consisting of an induction motor, a permanent magnet motor, and a synchronous motor.

4. The method of claim 1, wherein the generator, the alternating current bus, the power converter, the direct current bus, and the motor controller are on an aircraft.

5. An apparatus comprising:
a condition detector configured to:
identify an unbalanced voltage condition on an alternating current bus;
disconnect a power converter from the alternating current bus in response to identifying the unbalanced voltage condition for at least a time period selected such that the power converter is disconnected before the alternating current bus is disconnected from a generator due to the unbalanced voltage condition; and determine whether a tripping of a motor controller is accompanied by the unbalanced voltage condition in a power system and whether the unbalance voltage condition is less than a threshold for more than a time delay, wherein the power system comprises the generator, the power converter converts alternating current power on the alternating current bus to direct current power on a direct current bus, and the direct current power on the direct current bus powers the motor controller; and a controller configured to reset the motor controller in response to a determination that the tripping of the motor controller is accompanied by the unbalanced voltage condition and a determination that the unbalanced voltage condition is less than the threshold for more than the time delay, and wherein the controller is further configured to reconnect the power converter to the alternating current bus in response to the determination that the unbalanced voltage condition is less than the threshold for more than the time delay.

6. The apparatus of claim 5, wherein the unbalanced voltage condition was not caused downstream from an input to the power converter.

7. The apparatus of claim 5, wherein the motor controller comprises a solid state multifunctional motor controller configured to control a motor selected from a group of motors consisting of an induction motor, a permanent magnet motor, and a synchronous motor.

8. The apparatus of claim 5, wherein the generator, the alternating current bus, the power converter, the direct current bus, and the motor controller are on an aircraft.

* * * * *